(12) United States Patent
Lei (10) Patent No.: US 12,140,682 B2
(45) Date of Patent: Nov. 12, 2024

(54) POSITIONING PROCESSING METHOD AND RELATED APPARATUS

(71) Applicant: Tencent Technology (Shenzhen) Company Limited, Guangdong (CN)

(72) Inventor: Yixue Lei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 331 days.

(21) Appl. No.: 17/703,812

(22) Filed: Mar. 24, 2022

(65) Prior Publication Data

US 2022/0214461 A1 Jul. 7, 2022

Related U.S. Application Data

(63) Continuation of application No. PCT/CN2021/082738, filed on Mar. 24, 2021.

(30) Foreign Application Priority Data

May 4, 2020 (CN) .......................... 202010369573.7

(51) Int. Cl.
*G01S 19/43* (2010.01)
(52) U.S. Cl.
CPC .................................. *G01S 19/43* (2013.01)
(58) Field of Classification Search
CPC ......................................................... G01S 19/43
USPC ..................................................... 342/357.31
See application file for complete search history.

(56) References Cited

U.S. PATENT DOCUMENTS

| | | | |
|---|---|---|---|
| 9,439,163 B2* | 9/2016 | Ward | H04W 64/00 |
| 9,549,288 B2* | 1/2017 | Werner | G01S 5/10 |
| 2011/0117925 A1 | 5/2011 | Sampath et al. | |
| 2020/0322756 A1* | 10/2020 | Sosnin | H04W 4/029 |

FOREIGN PATENT DOCUMENTS

| | | | | |
|---|---|---|---|---|
| CN | 101657013 A | 2/2010 | | |
| CN | 101640836 A | 2/2020 | | |
| CN | 110933715 A | 3/2020 | | |
| CN | 110958685 A | 4/2020 | | |
| CN | 111610542 A | 9/2020 | | |
| WO | WO-2017181448 A1 * | 10/2017 | | |
| WO | WO-2018028941 A1 * | 2/2018 | ........... | G01S 5/0081 |
| WO | 2018058681 A1 | 4/2018 | | |
| WO | WO-2019023905 A1 * | 2/2019 | ............ | G01S 19/04 |
| WO | WO-2021207707 A2 * | 10/2021 | ......... | G01C 21/3815 |

OTHER PUBLICATIONS

International Search Report and Written Opinion issued Jun. 29, 2021 in Application No. PCT/CN2021/082738 with English Translation.

\* cited by examiner

*Primary Examiner* — Harry K Liu
(74) *Attorney, Agent, or Firm* — ArentFox Schiff LLP (57) ABSTRACT

A positioning processing method is provided. In the method, a positioning request is received. The positioning request includes identification information of a device. Rough location information of the device is acquired from a core network according to the identification information of the device. Differential assistance information is generated according to the rough location information of the device. The differential assistance information is transmitted to the device. A positioning location of the device is determined based on the differential assistance information.

20 Claims, 6 Drawing Sheets

POSITIONING PROCESSING METHOD AND RELATED APPARATUS

RELATED APPLICATIONS

This application is a continuation of International Application No. PCT/CN2021/082738, entitled "POSITIONING PROCESSING METHOD AND RELATED APPARATUS" and filed on Mar. 24, 2021, which claims priority to Chinese Patent Application No. 202010369573.7, entitled "POSITIONING PROCESSING METHOD AND APPARATUS, COMPUTER-READABLE MEDIUM, AND ELECTRONIC DEVICE" and filed on May 4, 2020. The entire disclosures of the prior applications are hereby incorporated by reference in its entirety.

FIELD OF THE TECHNOLOGY

This application relates to the field of computer and communication technologies, including positioning processing.

BACKGROUND OF THE DISCLOSURE

The basic principle of a global navigation satellite system (GNSS)-real-time kinematic (RTK) based high-precision positioning mechanism is that an RTK server generates RTK assistance information suitable for an approximate location of a terminal device, and then transmits the RTK assistance information to the terminal for positioning.

SUMMARY

Embodiments of this disclosure include a positioning processing method and related apparatus, to improve the real-time performance of positioning at least to some extent.

Other features and advantages of this disclosure become obvious through the following detailed descriptions, or may be partially recognized through the practice of this disclosure.

According to one aspect of the embodiments of this disclosure, a positioning processing method is provided. In the method, a positioning request is received. The positioning request includes identification information of a device. Rough location information of the device is acquired from a core network according to the identification information of the device. Differential assistance information is generated according to the rough location information of the device. The differential assistance information is transmitted to the device. A positioning location of the device is determined based on the differential assistance information.

According to one aspect of the embodiments of this disclosure, a positioning processing method is provided. In the method, a rough location acquisition request is received from a positioning server. The rough location acquisition request includes identification information of a device. Rough location information of the device is acquired according to the identification information of the device. The rough location information of the device is transmitted to the positioning server. Differential assistance information is generated based on the rough location information. Positioning processing is performed based on the differential assistance information.

According to one aspect of the embodiments of this disclosure, a positioning processing apparatus including processing circuitry is provided. The processing circuitry is configured to receive a positioning request. The positioning request including identification information of a device. The processing circuitry is configured to acquire rough location information of the device from a core network according to the identification information of the device, generate differential assistance information according to the rough location information of the device. The processing circuitry is configured to transmit the differential assistance information to the device. A positioning location of the device is determined based on the differential assistance information.

According to one aspect of the embodiments of this application, a positioning processing apparatus including processing circuitry is provided. The processing circuitry is configured to receive a rough location acquisition request from a positioning server. The rough location acquisition request including identification information of a device. The processing circuitry is configured to acquire rough location information of the device according to the identification information of the device, and transmit the rough location information of the device to the positioning server. Differential assistance information is generated based on the rough location information. Positioning processing is performed based on the differential assistance information.

According to one aspect of the embodiments of this disclosure, a non-transitory computer-readable storage medium is provided, storing instructions which when executed by a processor cause the processor to perform any of the positioning processing methods according to the foregoing aspects.

According to one aspect of the embodiments of this disclosure, an electronic device is provided, including a processor, a communication interface, a memory, and a communication bus, the processor, the communication interface, and the memory communicating with each other by using the communication bus; the communication interface being an interface of a communication module;

the memory being configured to store a program code, and transmit the program code to the processor; and the processor being configured to invoke instructions of the program code in the memory to perform any of the positioning processing methods according to the foregoing aspects.

According to one aspect of the embodiments of this disclosure, a computer program product including instructions is provided, the instructions, when run on a computer, causing the computer to perform the positioning processing method according to the foregoing aspects.

In the technical solutions provided in some embodiments of this disclosure, by acquiring rough location information of a to-be-positioned device from a core network, generating differential assistance information according to the rough location information, and transmitting the differential assistance information to the to-be-positioned device for positioning processing, a positioning server (for example, a real-time kinematic (RTK) server) can generate differential assistance information by acquiring the rough location information of the to-be-positioned device from the core network, so that an interaction process between the positioning server and the to-be-positioned device is reduced, and a delay for acquiring the rough location information of the to-be-positioned device is reduced, which is beneficial to improving the real-time performance of positioning.

It is to be understood that, the foregoing general descriptions and the following detailed descriptions are merely for illustration and explanation purposes and are not intended to limit this disclosure.

BRIEF DESCRIPTION OF THE DRAWINGS

Accompanying drawings herein, which are incorporated into and constitute a part of this specification, show embodiments that conform to this disclosure, and are used for describing a principle of this disclosure together with this specification. The accompanying drawings described below are merely some embodiments of this disclosure, and a person of ordinary skill in the art may further obtain other accompanying drawings according to the accompanying drawings. In the accompanying drawings.

DESCRIPTION OF EMBODIMENTS

Exemplary implementations will now be described with reference to the accompanying drawings. However, the exemplary implementations may be implemented in various forms and are not to be understood as being limited to the examples described herein.

In addition, the described features, structures, or characteristics may be combined in one or more embodiments in any appropriate manner. In the following descriptions, details are provided for understanding of the embodiments of this disclosure. However, a person skilled in the art is to be aware that, the technical solutions in this disclosure may be implemented without one or more of the particular details, or another method, unit, apparatus, or step may be used. In other cases, well-known methods, apparatuses, implementations, or operations may not shown or described in detail, to avoid obscuring the aspects of this disclosure.

The block diagrams shown in the accompanying drawings are merely functional entities and do not necessarily correspond to physically independent entities. That is, the functional entities may be implemented in a software form, or in processing circuitry such as one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

The basic principle of a global navigation satellite system (GNSS)-real-time kinematic (RTK) based high-precision positioning mechanism is that an RTK server generates RTK assistance information suitable for an approximate location of a terminal device, and then transmits the RTK assistance information to the terminal for positioning. If the RTK server does not have the approximate location of the terminal, the terminal needs to report a location thereof to the RTK server, and then the RTK server transmits differential assistance information to the terminal. In this case, one more interaction process is required between the RTK server and the terminal, which leads to an increase in delay and affects the real-time performance of positioning.

Figure 1:
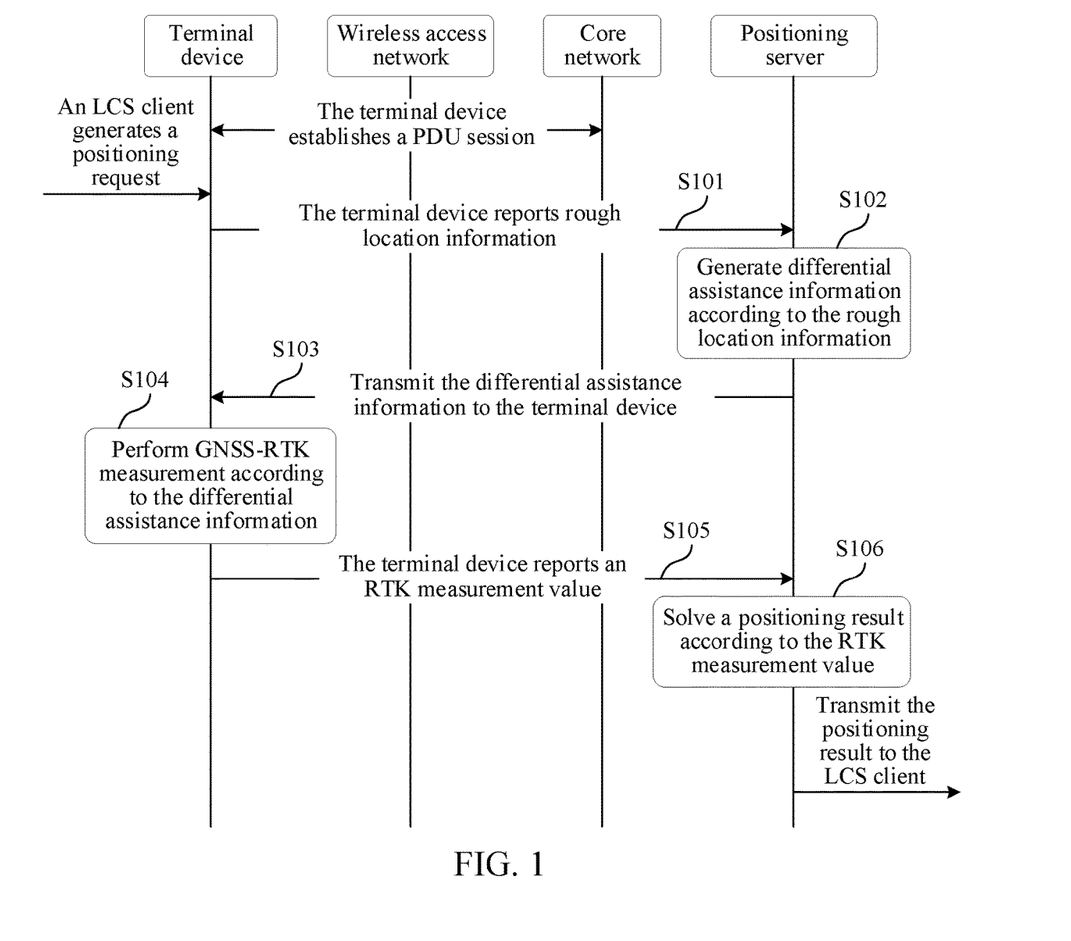
FIG. 1 shows an exemplary flowchart of interaction between a positioning server and a terminal.

As shown in FIG. 1, an interaction process between a positioning server and a terminal may include the following steps:

In step S101, after a terminal device establishes a protocol data unit (PDU) session, the terminal device reports rough location information to a positioning server (e.g., an RTK server) when a location service (LCS) client initiates a positioning request. The LCS client may be a client that is installed on the terminal device and that needs to use an LCS service. In other embodiments of this disclosure, the LCS client may alternatively be a client installed on the positioning server, or may alternatively be a client independent of the terminal device and the positioning server.

In step S102, the positioning server generates differential assistance information according to the rough location information reported by the terminal device.

In step S103, the positioning server transmits the differential assistance information to the terminal device.

In step S104, the terminal device performs GNSS-RTK measurement according to the differential assistance information transmitted by the positioning server.

In step S105, the terminal device reports an RTK measurement value to the positioning server.

In step S106, the positioning server performs positioning solution processing according to the RTK measurement value reported by the terminal device to obtain a positioning result, and then transmits the positioning result to the LCS client.

In the interaction process shown in FIG. 1, the terminal device transmits the rough location information to the positioning server. If an over the top (OTT, an OTT service such as an Internet company bypasses the operator and develops various video and data services based on an exposure Internet) method is adopted, and assuming that a round-trip time (RTT) delay between the positioning server and the terminal device is 10 ms in one direction, a finally formed positioning delay is increased by at least 20 ms because a time is also required for transmission of differential assistance information, RTK measurement, and positioning solution. However, for an application requiring real-time positioning information, especially for a terminal (e.g., an in-vehicle terminal or another intelligent terminal) lacking inertial navigation and another assisted positioning method, an excessive delay may easily cause a positioning deviation.

In addition, because the OTT method is likely to be adopted between the positioning server and the terminal device, a service data flow for positioning is not used as a control signaling for high-priority transmission. Therefore, the delay may be greater, and it is difficult for a GNSS-RTK positioning mechanism to adapt to a real-time positioning scenario, for example, an autonomous driving/unmanned driving scenario. Assuming that the OTT method is not adopted, but a method of pushing GNSS-RTK differential assistance information in advance is adopted, for example, pushing the GNSS-RTK differential assistance information through system information broadcasting, then an existing network base station needs to be updated and upgraded over an air interface. In addition, the system information broadcasting may occupy a large amount of broadcast radio resources, and the terminal device continuously monitors the GNSS-RTK information of differential positioning, which may further increase the processing overhead of the terminal device.

Based on the foregoing problems, embodiments of this disclosure include a lightweight GNSS-RTK short-latency positioning mechanism. The terminal device does not need to continuously monitor the GNSS-RTK differential assistance information broadcast by the base station, and the network device also does not need to be upgraded to support the broadcast of GNSS-RTK information over the air interface. To overcome the problem that the positioning server lacks the rough location information of the terminal device, the rough location information of the terminal device is provided by the core network to the positioning server by using the method of network capability exposure, so that an interaction process between the positioning server and the terminal device is reduced.

Exemplary implementation details of the technical solutions of the embodiments of this disclosure are described in detail below.

Figure 2:
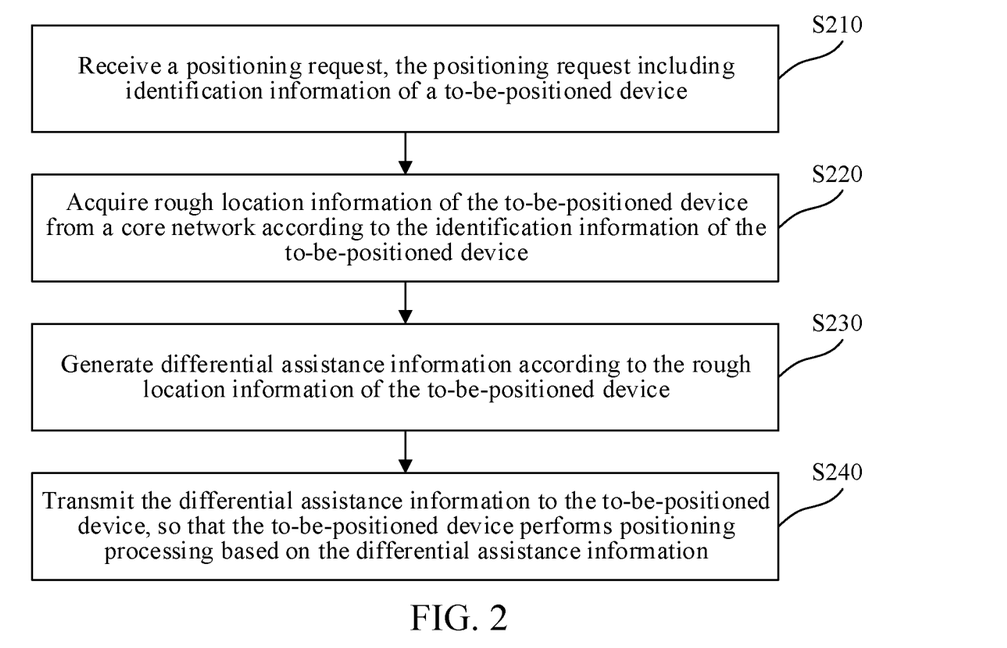
FIG. 2 shows an exemplary flowchart of a positioning processing method according to an embodiment of this disclosure.

FIG. 2 shows an exemplary flowchart of a positioning processing method according to an embodiment of this disclosure. The positioning processing method may be performed by a positioning server, and the positioning server may be an RTK server. Referring to FIG. 2, the positioning processing method includes at least steps S210 to S240, which are described in detail below.

In step S210, a positioning request is received, the positioning request including identification information of a to-be-positioned device.

In an embodiment of this disclosure, the positioning request may be transmitted by an LCS client. The identification information of the to-be-positioned device may be a generic public subscription identifier (GPSI) of the to-be-positioned device, or the identification information of the to-be-positioned device may be an international mobile subscriber identity (IMSI), a subscription permanent identifier (SUPI), or the like.

In step S220, rough location information of the to-be-positioned device is acquired from a core network according to the identification information of the to-be-positioned device.

In an embodiment of this disclosure, the acquiring rough location information of the to-be-positioned device from a core network may be transmitting a rough location acquisition request to the core network, the rough location acquisition request including the identification information of the to-be-positioned device, and then receiving the rough location information returned by the core network for the rough location acquisition request.

In an embodiment of this disclosure, the rough location information may be location-related information recorded by the core network during a connection and registration process of the terminal device. For example, for a terminal device in an idle state, the rough location information may be location information of a tracking area (TA) in which the terminal device is located. For a terminal device in a connected state, the rough location information may be location information of a cell to which the terminal device is registered. For a terminal device in an inactive state, the rough location information may be location information of a TA in which the terminal device is located, or may be location information of a RAN based notification area (RNA) of the terminal device. The RNA herein refers to a radio access network.

In an embodiment of this disclosure, the acquiring rough location information of the to-be-positioned device from a core network may further be acquiring a network address or a network address prefix of the to-be-positioned device from the core network according to the identification information of the to-be-positioned device, and then determining the rough location information of the to-be-positioned device based on the network address and the network address prefix.

In an embodiment of this disclosure, the positioning server may further indicate rough location acquisition delay information to the core network, the rough location acquisition delay information being used for indicating a time range of an acceptable delay for acquiring the rough location information. After obtaining the rough location acquisition delay information, and when it is within the time range of the acceptable delay, the core network may further perform a non-high-precision positioning on the to-be-positioned device to acquire the rough location information of the to-be-positioned device.

In an embodiment of this disclosure, the positioning server may further perform communication and interaction with the core network to negotiate with the core network a rough location information type satisfying a positioning precision requirement, the rough location information type being used for indicating precision of the rough location information. For example, the positioning server may negotiate with the core network whether the rough location information at the TA, RNA, and cell levels can satisfy the positioning precision requirement. When the positioning precision requirement cannot be satisfied, an IP address or an IP address prefix and other information may further be provided to calculate the rough location information of the to-be-positioned device.

In step S230, differential assistance information is generated according to the rough location information of the to-be-positioned device.

In step S240, the differential assistance information is transmitted to the to-be-positioned device, so that the to-be-positioned device performs positioning processing based on the differential assistance information.

In an embodiment of this disclosure, after the positioning server transmits the differential assistance information to the to-be-positioned device, the to-be-positioned device may measure a positioning signal based on the differential assistance information, and then transmit the positioning signal to the positioning server. In this way, the positioning server may perform positioning solution processing according to the received positioning signal, to obtain the positioning location of the to-be-positioned device. In an embodiment of this disclosure, after obtaining the positioning signal measured based on the differential assistance information, the to-be-positioned device may perform positioning solution processing to obtain the positioning location of the to-be-positioned device.

In an embodiment of this disclosure, after obtaining the positioning location for the to-be-positioned device, the positioning server may determine a deviation between the positioning location and the rough location information according to the positioning location and the rough location information of the to-be-positioned device. When the deviation between the positioning location and the rough location information is greater than a specified threshold, a target area corresponding to the rough location information may be determined according to the rough location information, and then information of the target area is provided to the core network, so that the core network optimizes the rough location information of the to-be-positioned device in the target area. For example, the core network may improve the precision of the rough location information of the to-be-positioned device in the target area by combining other positioning methods.

The technical solution of the embodiment shown in FIG. 2 enables the positioning server to generate the differential assistance information by acquiring the rough location information of the to-be-positioned device from the core network, which reduces a delay for acquiring the rough location information of the to-be-positioned device, and is beneficial to improving the real-time performance of positioning.

Figure 3:
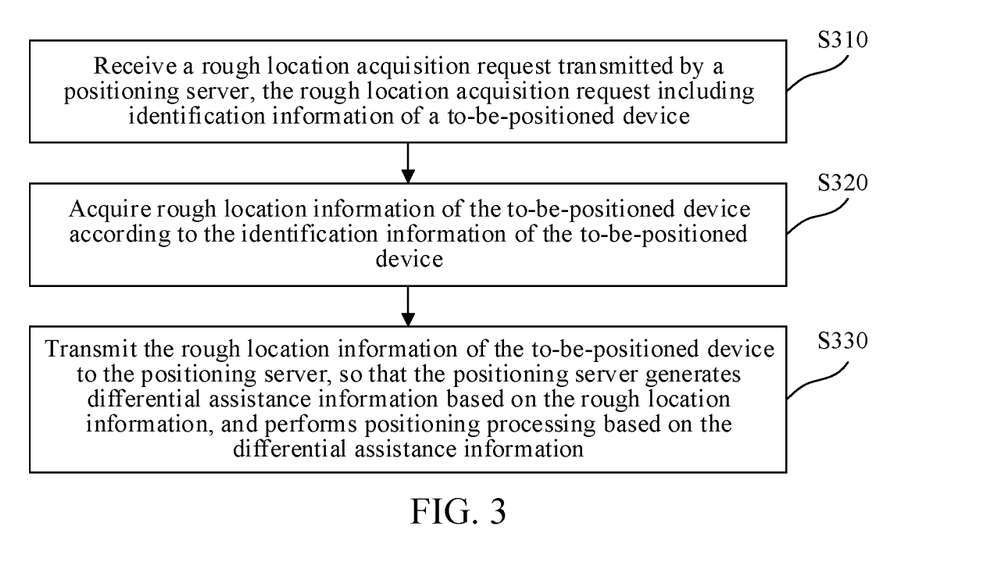
FIG. 3 shows an exemplary flowchart of a positioning processing method according to an embodiment of this disclosure.

FIG. 3 shows a flowchart of a positioning processing method according to an embodiment of this disclosure. The positioning processing method may be performed by a core network device. For example, the core network device may be a network exposure function (NEF) entity. Referring to FIG. 3, the positioning processing method includes at least steps S310 to S330, which are described in detail below.

In step S310, a rough location acquisition request transmitted by a positioning server is received, the rough location acquisition request including identification information of a to-be-positioned device.

In an embodiment of this disclosure, the identification information of the to-be-positioned device may be a GPSI of the to-be-positioned device, or the identification information of the to-be-positioned device may be an IMSI, an SUFI, or the like.

In step S320, rough location information of the to-be-positioned device is acquired according to the identification information of the to-be-positioned device.

In an embodiment of this disclosure, location-related information of the to-be-positioned device recorded during a connection and registration process of the to-be-positioned device may be acquired according to the identification information of the to-be-positioned device, the location-related information including location information of a TA, location information of a registered cell, and location information of an RNA. For example, for a terminal device in an idle state, the rough location information may be location information of a TA in which the terminal device is located. For a terminal device in a connected state, the rough location information may be location information of a cell to which the terminal device is registered. For a terminal device in an inactive state, the rough location information may be location information of a TA in which the terminal device is located, or may be location information of an RNA of the terminal device.

In an embodiment of this disclosure, the core network device may further acquire rough location acquisition delay information transmitted by the positioning server. When a time delay of performing a positioning operation on the to-be-positioned device is less than a time range of an acceptable delay identified by the rough location acquisition delay information, the core network device may also perform the positioning operation on the to-be-positioned device according to the identification information of the to-be-positioned device, and then transmit a positioning result as the rough location information to the positioning server.

In step S330, the rough location information of the to-be-positioned device is transmitted to the positioning server, so that the positioning server generates differential assistance information based on the rough location information, and performs positioning processing based on the differential assistance information.

In an embodiment of this disclosure, for the solution that the positioning server generates differential assistance information based on the rough location information, and performs positioning processing based on the differential assistance information, reference may be made to the technical solutions of the foregoing embodiments.

The technical solution of the embodiment shown in FIG. 3 enables the core network device to transmit the rough location information of the to-be-positioned device to the positioning server, so that the positioning server generates the differential assistance information, thereby reducing the delay for acquiring the rough location information of the to-be-positioned device by the positioning server, which is beneficial to improving the real-time performance of positioning.

In the foregoing embodiments, the technical solutions of the embodiments of this disclosure are described from the perspectives of the positioning server and the core network device respectively. The following describes the implementation details of the positioning processing method of the embodiments of this disclosure in detail with reference to FIG. 4 and FIG. 5.

Figure 4:
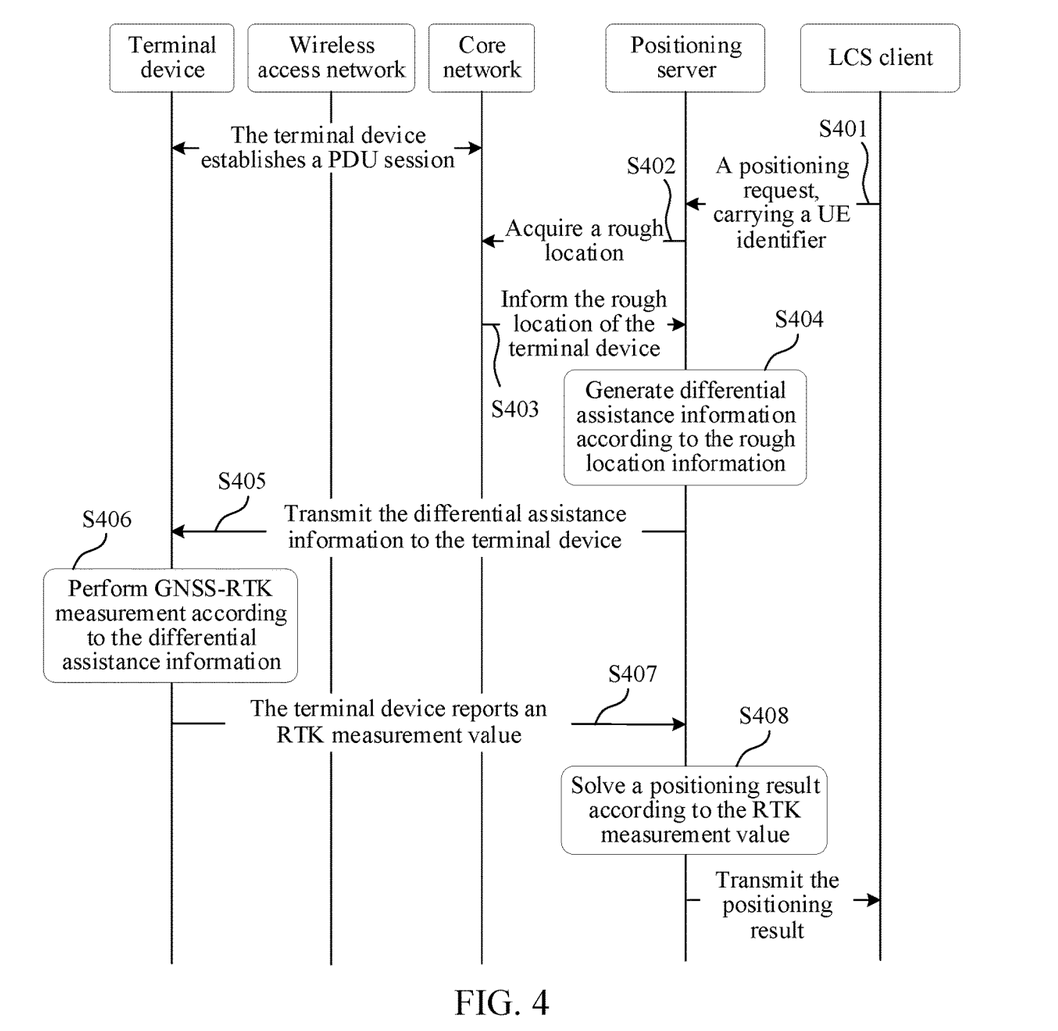
FIG. 4 shows an exemplary flowchart of a positioning processing method according to an embodiment of this disclosure.

As shown in FIG. 4, according to the positioning processing method of an embodiment of this disclosure, after the terminal device and the core network establish a PDU session, an interaction process between entities includes the following steps:

In step S401, an LCS client transmits a positioning request to a positioning server, where the positioning request includes a user equipment (UE) identifier, and the UE identifier is an identifier of a device that needs to be positioned, and for a 5G system, the identifier may be a GPSI.

In step S402, the positioning server transmits a request for acquiring a rough location of a terminal device to a core network.

In an embodiment of this disclosure, the positioning server and a network RTK server may be separate entities, or deployed in one entity. In an embodiment, the positioning server may be used as an application function (AF) to acquire capability exposure information, that is, rough location information of the terminal device, from a 5G core network.

In an embodiment of this disclosure, whether to initiate a request for acquiring a rough location may be determined according to the positioning precision requirement. For some scenarios that do not require high-precision positioning, for example, long-distance cargo transportation, because it is only necessary to learn which road section the transport vehicle is currently located on (the positioning precision can be within a few hundred meters or 1 kilometer), there is no need to trigger an operation of a high-precision positioning request. For scenarios that require high-precision positioning, a high-precision positioning operation needs to be triggered, that is, the rough location information of the terminal device needs to be obtained.

In an embodiment of this application, after transmitting the request for acquiring the rough location information, the positioning server may indicate a delay range for acquiring the rough location information to the core network. The rough location information in the core network may not need to be acquired specially because the rough location information of the terminal device can already be obtained during the process of connection and registration management of the terminal device. In this case, a time delay for the positioning server to acquire the rough location information is very short. When the time delay is within an acceptable delay range, the core network may also perform a non-high-precision positioning operation.

In step S403, the core network informs the positioning server of the rough location of the terminal device.

In an embodiment of this disclosure, the rough location information may also be a TA of a terminal in an idle state or an inactive state, a cell ID of a terminal in a connected state, an RNA of a terminal in an inactive state, or the like. The information of such a type may be acquired without any additional positioning calculation performed by the core network. The reason is that for terminals in different radio resource control (RRC) states, the TA, cell, and RNA have been maintained. That is, a network of the operator may still provide the information even if the network does not support specific positioning algorithms.

In an embodiment of this disclosure, the core network may transmit the rough location of the terminal device to an AF, and then the AF interacts with the positioning server to transmit the rough location to the positioning server. When the AF and the positioning server are deployed in the same entity, there is no need for an interaction between the entities.

In step S404, the positioning server generates differential assistance information according to the rough location information provided by the core network. After obtaining the rough location information provided by the core network, the positioning server may obtain precise differential assistance information based on the rough location information.

In step S405, the positioning server transmits the differential assistance information to the terminal device.

In step S406, the terminal device performs GNSS-RTK measurement according to the differential assistance information transmitted by the positioning server.

In step S407, the terminal device reports an RTK measurement value to the positioning server.

In step S408, the positioning server performs positioning solution processing according to the RTK measurement value reported by the terminal device to obtain a positioning result, and then transmits the positioning result to the LCS client.

Figure 5:
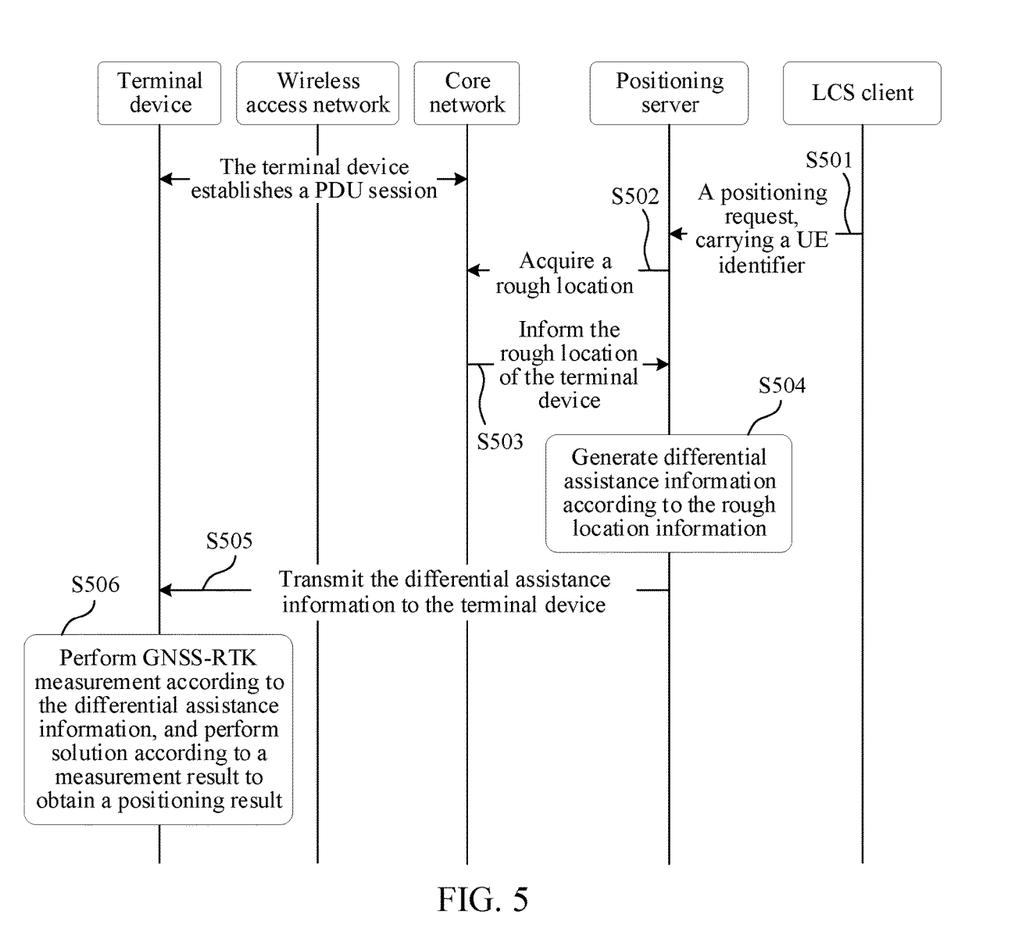
FIG. 5 shows an exemplary flowchart of a positioning processing method according to an embodiment of this disclosure.

As shown in FIG. 5, according to the positioning processing method of an embodiment of this disclosure, after the terminal device and the core network establish a PDU session, an interaction process between entities includes the following steps:

In step S501, an LCS client transmits a positioning request to a positioning server, where the positioning request includes a user equipment (UE) identifier, and the UE identifier is an identifier of a device that needs to be positioned, and for a 5G system, the identifier may be a GPSI.

In step S502, the positioning server transmits a request for acquiring a rough location of a terminal device to a core network.

In an embodiment of this disclosure, the positioning server and a network RTK server may be separate entities, or deployed in one entity. In an embodiment, the positioning server may be used as an AF to acquire capability exposure information, that is, rough location information of the terminal device, from a 5G core network.

In an embodiment of this disclosure, whether to initiate a request for acquiring a rough location may be determined according to the positioning precision requirement. For some scenarios that do not require high-precision positioning, for example, long-distance cargo transportation, because it is only necessary to learn which road section the transport vehicle is currently located on (the positioning precision can be within a few hundred meters or 1 kilometer), there is no need to trigger an operation of a high-precision positioning request. For scenarios that require high-precision positioning, a high-precision positioning operation needs to be triggered, that is, the rough location information of the terminal device needs to be obtained.

In an embodiment of this disclosure, after transmitting the request for acquiring the rough location information, the positioning server may indicate a delay range for acquiring the rough location information to the core network. The rough location information in the core network may not need to be acquired specially because the rough location information of the terminal device can already be obtained during the process of connection and registration management of the terminal device. In this case, a time delay for the positioning server to acquire the rough location information is very short. When the time delay is within an acceptable delay range, the core network may also perform a non-high-precision positioning operation.

In step S503, the core network informs the positioning server of the rough location of the terminal device.

In an embodiment of this disclosure, the rough location information may also be a TA of a terminal in an idle state or an inactive state, a cell ID of a terminal in a connected state, an RNA of a terminal in an inactive state, or the like. The information of such a type may be acquired without any additional positioning calculation performed by the core network. The reason is that for terminals in different RRC states, the TA, cell, and RNA have been maintained. That is, a network of the operator may still provide the information even if the network does not support specific positioning algorithms.

In an embodiment of this disclosure, the core network may transmit the rough location of the terminal device to an AF, and then the AF interacts with the positioning server to transmit the rough location to the positioning server. When the AF and the positioning server are deployed in the same entity, there is no need for an interaction between the entities.

In step S504, the positioning server generates differential assistance information according to the rough location information provided by the core network. After obtaining the rough location information provided by the core network, the positioning server may obtain precise differential assistance information based on the rough location information.

In step S505, the positioning server transmits the differential assistance information to the terminal device.

In step S506, the terminal device performs GNSS-RTK measurement according to the differential assistance information transmitted by the positioning server, and performs positioning solution processing according to a measurement result to obtain a positioning result.

In an embodiment of this disclosure, when the LCS client is deployed in the terminal device, the terminal device may directly use the positioning result after the positioning result is obtained by performing the positioning solution. When the LCS client is not deployed in the terminal device, after obtaining the positioning result, the terminal device may transmit the positioning result to the LCS client.

For the embodiments shown in FIG. 4 and FIG. 5, the positioning server (the positioning server may be an AF or an RTK server) may interact with the core network in advance and dynamically (the process may be independent of each positioning service), and determine in advance whether rough positions at the TA, RNA, and cell levels can satisfy the requirement of high-precision positioning assistance data. When the precision of these rough locations is poor (such as the TA), then the core network may further provide other information to assist the positioning server to infer the rough location of the terminal device. For example, the positioning server may calculate a rough geographic location of the terminal device according to information such as an IP address or an IP address prefix. The operator of the positioning server may also share information with the network operator, for example, pre-evaluate a position of the base station in the network. The positioning server may also perform dynamic statistical learning by comparing a rough position and an RTK positioning result, and mark a geographical area with an excessively large rough position deviation. The network operator may improve the positioning precision of these areas by combining overlay 4G network information and other methods, and the network operator may even provide the positioning result of the terminal device (provided that the positioning delay is controlled within a certain range) to the positioning server through non-high-precision positioning to assist the positioning server to generate differential positioning information.

In the technical solutions of the embodiments of this disclosure, the problem of an excessive delay in final positioning due to the excessive delay in acquiring the rough position can be avoided in the high-precision positioning solution based on the OTT method, which improves the real-time performance of positioning, and is beneficial to positioning service deployment and improving user experience.

The following describes apparatus embodiments of this disclosure, which may be used for performing the positioning processing method in the foregoing embodiments of this disclosure. For details not disclosed in the apparatus embodiments of this disclosure, reference may be made to the foregoing embodiments of the positioning processing method of this disclosure.

Figure 6:
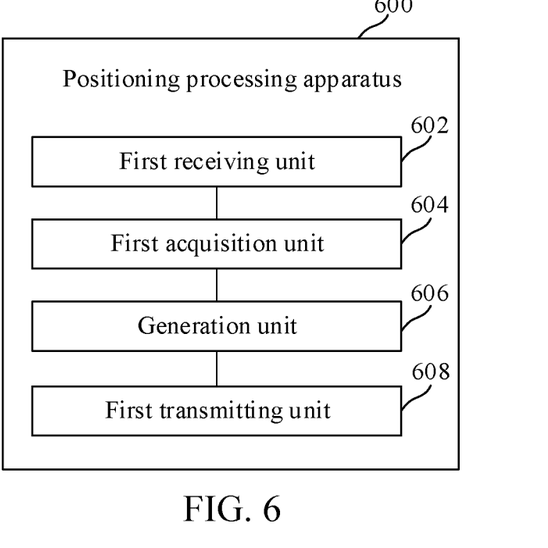
FIG. 6 shows an exemplary block diagram of a positioning processing apparatus according to an embodiment of this disclosure.

FIG. 6 shows a block diagram of a positioning processing apparatus according to an embodiment of this disclosure.

Referring to FIG. 6, a positioning processing apparatus 600 according to an embodiment of this disclosure includes: a first receiving unit 602, a first acquisition unit 604, a generation unit 606, and a first transmitting unit 608. One or more units of the apparatus can be implemented by processing circuitry, software, or a combination thereof, for example.

The first receiving unit 602 is configured to receive a positioning request, the positioning request including identification information of a to-be-positioned device. The first acquisition unit 604 is configured to acquire rough location information of the to-be-positioned device from a core network according to the identification information of the to-be-positioned device. The generation unit 606 is configured to generate differential assistance information according to the rough location information of the to-be-positioned device. The first transmitting unit 608 is configured to transmit the differential assistance information to the to-be-positioned device, so that the to-be-positioned device performs positioning processing based on the differential assistance information.

In some embodiments of this disclosure, based on the foregoing solutions, the first acquisition unit 604 is configured to: transmit a rough location acquisition request to the core network, the rough location acquisition request including the identification information of the to-be-positioned device; and receive rough location information returned by the core network for the rough location acquisition request.

In some embodiments of this disclosure, based on the foregoing solutions, the first transmitting unit 608 is further configured to: indicate rough location acquisition delay information to the core network, the rough location acquisition delay information being used for indicating a time range of an acceptable delay for acquiring the rough location information.

In some embodiments of this disclosure, based on the foregoing solutions, when the to-be-positioned device is in an idle state, the rough location information includes location information of a TA in which the to-be-positioned device is located. When the to-be-positioned device is in a connected state, the rough location information includes location information of a cell to which the to-be-positioned device is registered. When the to-be-positioned device is in an inactive state, the rough location information includes at least one of the following: the location information of the TA in which the to-be-positioned device is located, and location information of an RNA of the to-be-positioned device.

In some embodiments of this disclosure, based on the foregoing solutions, the first receiving unit 602 is further configured to receive a positioning signal measured by the to-be-positioned device based on the differential assistance information, and determine a positioning location for the to-be-positioned device based on the positioning signal.

In some embodiments of this disclosure, based on the foregoing solutions, the first acquisition unit 604 is configured to: acquire a network address or a network address prefix of the to-be-positioned device from the core network according to the identification information of the to-be-positioned device; and determine the rough location information of the to-be-positioned device based on the network address or the network address prefix.

In some embodiments of this disclosure, based on the foregoing solutions, the first acquisition unit 604 is further configured to: acquire a positioning location for the to-be-positioned device; and the first transmitting unit 608 is further configured to: determine a target area corresponding to the rough location information when it is determined that a deviation between the rough location information and the positioning location is greater than a specified threshold according to the positioning location and the rough location information, and provide information of the target area to the core network, so that the core network optimizes rough location information of a to-be-positioned device in the target area.

In some embodiments of this disclosure, based on the foregoing solutions, the positioning processing apparatus 600 further includes: an interaction unit, configured to perform communication and interaction with the core network to negotiate with the core network a rough location information type that can satisfy a positioning precision requirement, the rough location information type being used for indicating precision of the rough location information.

Figure 7:
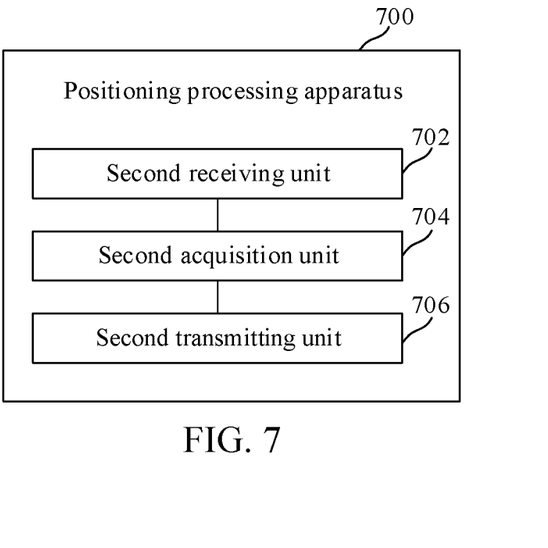
FIG. 7 shows an exemplary block diagram of a positioning processing apparatus according to an embodiment of this disclosure.

FIG. 7 shows a block diagram of a positioning processing apparatus according to an embodiment of this disclosure.

Referring to FIG. 7, a positioning processing apparatus 600 according to an embodiment of this disclosure includes: a second receiving unit 702, a second acquisition unit 704, and a second transmitting unit 706. One or more units of the apparatus can be implemented by processing circuitry, software, or a combination thereof, for example.

The second receiving unit 702 is configured to receive a rough location acquisition request transmitted by a positioning server, the rough location acquisition request including identification information of a to-be-positioned device. The second acquisition unit 704 is configured to acquire rough location information of the to-be-positioned device according to the identification information of the to-be-positioned device. The second transmitting unit 706 is configured to transmit the rough location information of the to-be-positioned device to the positioning server, so that the positioning server generates differential assistance information based on the rough location information, and performs positioning processing based on the differential assistance information.

In some embodiments of this disclosure, based on the foregoing solutions, the second acquisition unit 704 is configured to: acquire, according to the identification information of the to-be-positioned device, location-related information of the to-be-positioned device recorded during a connection and registration process of the to-be-positioned device, the location-related information including location information of a TA, location information of a registered cell, and location information of an RNA.

In some embodiments of this disclosure, based on the foregoing solutions, the second acquisition unit 704 is configured to: acquire rough location acquisition delay information transmitted by the positioning server, the rough location acquisition delay information being used for indicating a time range of an acceptable delay for acquiring the rough location information; and when a time delay of performing a positioning operation on the to-be-positioned device is less than the time range, perform the positioning operation on the to-be-positioned device according to the identification information of the to-be-positioned device, and use a positioning result as the rough location information.

Figure 8:
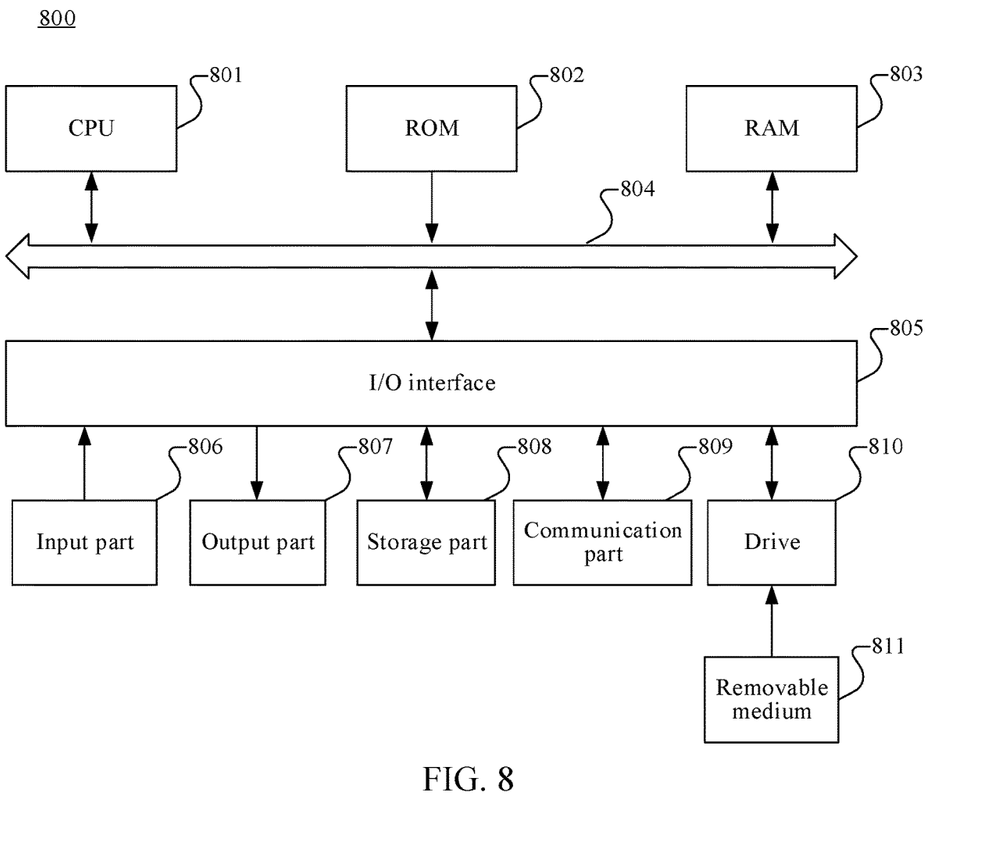
FIG. 8 shows an exemplary computer system adapted to implement an electronic device of embodiments of this disclosure.

FIG. 8 shows a schematic structural diagram of an exemplary computer system adapted to implement an electronic device of embodiments of this disclosure.

A computer system 800 of the electronic device shown in FIG. 8 is merely an example, and does not constitute any limitation on functions and use ranges of the embodiments of this disclosure.

As shown in FIG. 8, the computer system 800 includes processing circuitry such as a central processing unit (CPU) 801, which may perform various suitable actions and processing based on a program stored in a read-only memory (ROM) 802 or a program loaded from a storage part 808 into a random access memory (RAM) 803, for example, perform the method according to the foregoing embodiments. The RAM 803 further stores various programs and data required for system operations. The CPU 801, the ROM 802, and the RAM 803 are connected to each other through a bus 804. An input/output (I/O) interface 805 is also connected to the bus 804.

The following components are connected to the I/O interface 805: an input part 806 including a keyboard, a mouse, or the like; an output part 807 including a cathode ray tube (CRT), a liquid crystal display (LCD), a speaker, or the like; a storage part 808 including a hard disk, or the like; and a communication part 809 including a network interface card such as a local area network (LAN) card, a modem, or the like. The communication part 809 performs communication processing by using a network such as the Internet. A drive 810 is also connected to the I/O interface 805 as required. A removable medium 811, such as a magnetic disk, an optical disc, a magneto-optical disk, or a semiconductor memory, is installed on the drive 810 as required, so that a computer program read from the removable medium is installed into the storage part 808 as required.

Particularly, according to an embodiment of this disclosure, the processes described in the following by referring to the flowcharts may be implemented as computer software programs. For example, an embodiment of this disclosure includes a computer program product. The computer program product includes a computer program stored in a computer-readable medium. The computer program includes a computer program used for performing a method shown in the flowchart. In such an embodiment, the computer program may be downloaded and installed from the network through the communication part 809, and/or installed from the removable medium 811. When the computer program is executed by the CPU 801, the various functions defined in the system of this disclosure are executed.

The computer-readable medium shown in the embodiments of this disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include a non-transitory computer-readable storage medium but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this disclosure, the computer-readable storage medium may be any tangible medium containing or storing a program, and the program may be used by or used in combination with an instruction execution system, apparatus, or device. In this disclosure, the computer-readable signal medium may include a data signal transmitted in a baseband or as part of a carrier, and stores a computer-readable computer program. The data signal propagated in such a way may assume a plurality of forms, including, but is not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including, but is not limited to: a wireless medium, a wired medium, or the like, or any suitable combination thereof.

The flowcharts and block diagrams in the accompanying drawings illustrate possible system architectures, functions, and operations that may be implemented by a system, a method, and a computer program product according to various embodiments of this disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this disclosure may be implemented in a software manner, or may be implemented in a hardware manner, and the unit described can also be set in a processor. Names of the units do not constitute a limitation on the units in a specific case.

According to another aspect, this disclosure further provides a computer readable medium. The computer readable medium may be included in the electronic device according to the foregoing embodiments, or may exist alone without being assembled into the electronic device. The computer-readable medium carries one or more programs, the one or more programs, when executed by the electronic device, causing the electronic device to implement the method according to the foregoing embodiments.

An embodiment of this disclosure further provides a computer program product including instructions, the instructions, when run on a computer, causing the computer to perform the method according to the foregoing embodiments.

Although a plurality of modules or units of a device configured to perform actions are discussed in the foregoing detailed description, such division is not mandatory. Actually, according to the implementations of this disclosure, the features and functions of two or more modules or units described above may be specifically implemented in one module or unit. On the contrary, the features and functions of one module or unit described above may be further divided to be embodied by a plurality of modules or units.

Through the descriptions of the foregoing implementations, a person skilled in the art should recognize that the exemplary implementations described herein may be implemented through software, or may be implemented through software located in combination with necessary hardware. Therefore, the technical solutions of the embodiments of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this disclosure.

After considering the specification and practicing the disclosed embodiments, a person skilled in the art may conceive of other implementations of this disclosure. This disclosure is intended to cover any variations, uses, or adaptive changes of this disclosure following the general principles of this disclosure, and includes well-known knowledge and conventional technical means in the art and undisclosed in this disclosure.

It is to be understood that this disclosure is not limited to the precise structures described above and shown in the accompanying drawings, and various modifications and changes may be made without departing from the scope of this disclosure.

What is claimed is:

1. A positioning processing method, comprising:
   receiving, by processing circuitry of a positioning server, a positioning request, the positioning request including identification information of a device;
   acquiring, by the processing circuitry of the positioning server, rough location information of the device from a core network according to a rough location acquisition request that indicates the identification information of the device, the rough location information including location-related information that is recorded by the core network before the rough location acquisition request is received by the core network;
   generating differential assistance information according to the rough location information of the device received from the core network; and
   transmitting, by the processing circuitry of the positioning server, the differential assistance information to the device, wherein
   a positioning location of the device is determined based on the differential assistance information.

2. The positioning processing method according to claim 1, wherein the acquiring the rough location information comprises:
   transmitting, by the processing circuitry of the positioning server, a rough location acquisition request to the core network, the rough location acquisition request including the identification information of the device; and
   receiving, by the processing circuitry of the positioning server, the rough location information returned by the core network in response to the rough location acquisition request.

3. The positioning processing method according to claim 1, further comprising:
   providing rough location acquisition delay information to the core network, the rough location acquisition delay information indicating a time range of an acceptable delay for acquiring the rough location information.

4. The positioning processing method according to claim 1, wherein
   when the device is in an idle state, the rough location information includes location information of a tracking area (TA) in which the device is located;
   when the device is in a connected state, the rough location information includes location information of a cell to which the device is registered; and
   when the device is in an inactive state, the rough location information includes at least one of the location information of the TA in which the device is located or location information of a radio access network based notification area (RNA) of the device.

5. The positioning processing method according to claim 1, further comprising:
   receiving a positioning signal determined by the device based on the differential assistance information; and
   determining the positioning location of the device based on the positioning signal.

6. The positioning processing method according to claim 1, wherein the acquiring the rough location information comprises:
   acquiring the location-related information that indicates one of a network address or a network address prefix of the device from the core network according to the identification information of the device; and
   determining the rough location information of the device based on the one of the network address or the network address prefix.

7. The positioning processing method according to claim 1, further comprising:
   acquiring the positioning location of the device;
   determining a target area corresponding to the rough location information based on a determination that a deviation between the rough location information and the positioning location is greater than a threshold; and providing information of the target area to the core network, such that the core network optimizes the rough location information of the device in the target area.

8. The positioning processing method according to claim 1, further comprising:

performing communication and interaction with the core network to negotiate with the core network a rough location information type satisfying a positioning precision requirement, the rough location information type indicating a precision of the rough location information.

9. A positioning processing method, comprising:

receiving, by processing circuitry of a core network, a rough location acquisition request from a positioning server, the rough location acquisition request including identification information of a device;

acquiring, by the processing circuitry of the core network, rough location information of the device according to the identification information of the device, the rough location information including location-related information that is recorded by the core network before the rough location acquisition request is received by the core network; and transmitting, by the processing circuitry of the core network, the rough location information of the device to the positioning server, wherein differential assistance information is generated based on the rough location information, and positioning processing is performed based on the differential assistance information.

10. The positioning processing method according to claim 9, wherein the acquiring the rough location information comprises:

acquiring, according to the identification information of the device, the location-related information of the device recorded during a connection and registration process of the device, the location-related information including at least one of location information of a tracking area (TA), location information of a registered cell, or location information of a radio access network based notification area (RNA).

11. The positioning processing method according to claim 9, wherein the acquiring the rough location information comprises:

acquiring rough location acquisition delay information from the positioning server, the rough location acquisition delay information indicating a time range of an acceptable delay for acquiring the rough location information;

when a time delay of performing a positioning operation on the device is less than the time range, performing the positioning operation on the device according to the identification information of the device; and acquiring the rough location information based on a positioning result of the positioning operation.

12. A positioning processing apparatus, comprising:

processing circuitry configured to:

receive a positioning request, the positioning request including identification information of a device;

acquire rough location information of the device from a core network according to a rough location acquisition request that indicates the identification information of the device, the rough location information including location-related information that is recorded by the core network before the rough location acquisition request is received by the core network;

generate differential assistance information according to the rough location information of the device received from the core network; and transmit the differential assistance information to the device, wherein a positioning location of the device is determined based on the differential assistance information.

13. The positioning processing apparatus according to claim 12, wherein the processing circuitry is configured to:

transmit a rough location acquisition request to the core network, the rough location acquisition request including the identification information of the device; and acquire the rough location information returned by the core network in response to the rough location acquisition request.

14. The positioning processing apparatus according to claim 12, wherein the processing circuitry is configured to:

provide rough location acquisition delay information to the core network, the rough location acquisition delay information indicating a time range of an acceptable delay for acquiring the rough location information.

15. The positioning processing apparatus according to claim 12, wherein when the device is in an idle state, the rough location information includes location information of a tracking area (TA) in which the device is located;

when the device is in a connected state, the rough location information includes location information of a cell to which the device is registered; and when the device is in an inactive state, the rough location information includes at least one of the location information of the TA in which the device is located or location information of a radio access network based notification area (RNA) of the device.

16. The positioning processing apparatus according to claim 12, wherein the processing circuitry is configured to:

receive a positioning signal determined by the device based on the differential assistance information; and determine the positioning location of the device based on the positioning signal.

17. The positioning processing apparatus according to claim 12, wherein the processing circuitry is configured to:

acquire the location-related information that indicates one of a network address or a network address prefix of the device from the core network according to the identification information of the device; and determine the rough location information of the device based on the one of the network address or the network address prefix.

18. The positioning processing apparatus according to claim 12, wherein the processing circuitry is configured to:

acquire the positioning location of the device;

determine a target area corresponding to the rough location information based on a determination that a deviation between the rough location information and the positioning location is greater than a threshold; and provide information of the target area to the core network, such that the core network optimizes the rough location information of the device in the target area.

19. The positioning processing apparatus according to claim 12, wherein the processing circuitry is configured to:

perform communication and interaction with the core network to negotiate with the core network a rough location information type that satisfies a positioning precision requirement, the rough location information type indicating a precision of the rough location information.

20. A non-transitory computer-readable storage medium storing instructions which when executed by a processor cause the processor to perform the positioning processing method according to claim 1.

* * * * *

UNITED STATES PATENT AND TRADEMARK OFFICE
CERTIFICATE OF CORRECTION

PATENT NO. : 12,140,682 B2  
APPLICATION NO. : 17/703812  
DATED : November 12, 2024  
INVENTOR(S) : Yixue Lei Page 1 of 1

It is certified that error appears in the above-identified patent and that said Letters Patent is hereby corrected as shown below:

On the Title Page

Item (71), the Applicant city reads as:  
Guangdong (CN)  
The Applicant city should read as:  
--Shenzhen (CN)--

Signed and Sealed this  
Thirty-first Day of December, 2024

Derrick Brent  
*Acting Director of the United States Patent and Trademark Office*